United States Patent [19]

Lee

[11] Patent Number: 4,621,825
[45] Date of Patent: Nov. 11, 1986

[54] OSCILLATING SKATEBOARD

[76] Inventor: Robert E. Lee, 640 S. Main St., Los Angeles, Calif. 90014

[21] Appl. No.: 617,992

[22] Filed: Jun. 6, 1984

Related U.S. Application Data

[63] Continuation-in-part of Ser. No. 555,272, Nov. 16, 1983.

[51] Int. Cl.⁴ .............................................. B62M 1/04
[52] U.S. Cl. ..................................... 280/218; 280/221
[58] Field of Search ............ 280/11.115, 1.181, 1.191, 280/87.04 R, 87.04 A, 218, 221, 249

[56] References Cited

U.S. PATENT DOCUMENTS

| | | |
|---|---|---|
| 222,034 | 11/1879 | Gornall ........................ 280/11.115 |
| 1,259,592 | 3/1918 | Benson ................................ 280/221 |
| 1,364,471 | 1/1921 | Ameli ................................. 280/221 |
| 3,035,854 | 5/1962 | Johnston ......................... 280/259 X |
| 3,438,642 | 4/1969 | Kite et al. ................ 280/87.04 R X |
| 3,438,649 | 4/1969 | Schermerhorn et al. .......... 280/259 |
| 3,902,739 | 9/1975 | Kimura ............................... 280/249 |
| 4,181,319 | 1/1980 | Hirbod ...................... 280/11.115 X |

Primary Examiner—Joseph F. Peters, Jr.
Assistant Examiner—Michael Mar

[57] ABSTRACT

This invention relates to a new and improved skateboard of the type enabling the user to stand on the platform and shift his weight thereon to effect the forward motion of the skate board. The skate board may also be modified to be used as a weight carrier, in which the weight is loaded on the platform and the platform is oscillated.

2 Claims, 4 Drawing Figures

OSCILLATING SKATEBOARD

This application is a continuation - in-part of application Ser. No. 06/555,272 filed Dec. 16, 1983, titled Rockable Oscillating Weight Carrier.

This invention relates to the art of skateboards which may be built in various sizes and shapes. More particularly, this invention is for a skateboard which is propelled by the shifting of weight on the same about its transverse axis and alternately applying force on the one-way ratchet-clutches which engage the axle in one direction and run free in the other direction.

An object of this invention is a provision of a means of transportation which is inexpensive to manufacture and uses no fuel.

A further object of this invention is to provide a propulsion means that will be practical for recreational usage.

It is a further object of this invention to provide a weight carrier adaptable to many uses.

Still additional objects, benefits and advantages of this invention will become evident from a study of the following detailed description taken in conjunction with the accompanying drawing, in which.

Figure 1:
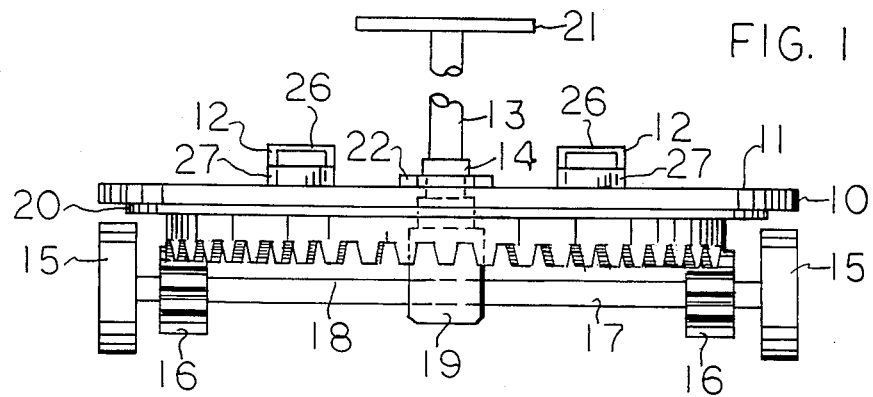
FIG. 1 is an end elevation view of the general weight carrier and/or skateboard.
Figure 2:
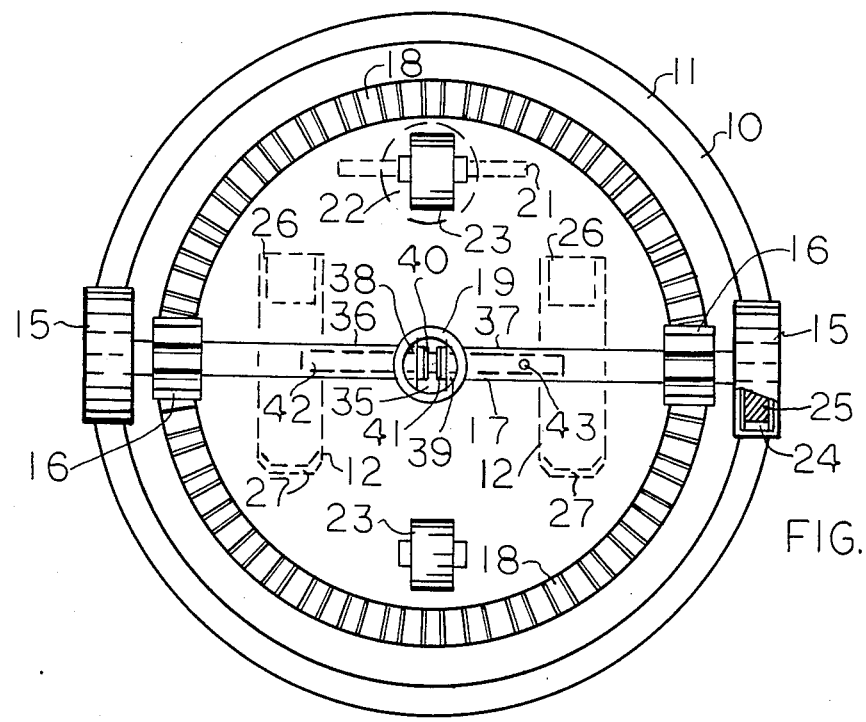
FIG. 2 is a bottom plan view, that is looking at the under side of the skateboard.
Figures 3, 4:
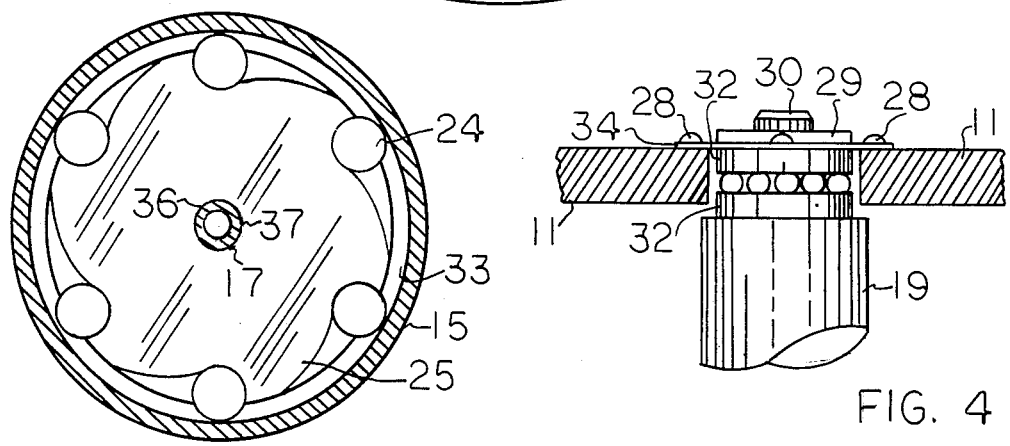
FIG. 3 is a side sectional view of one of the ratchet-clutches which engage the axle in one direction.
FIG. 4 is a sectional view of the pivot member which permits the footboard to pivot or rotate while being secured to the transverse axle.

As shown in the drawing, the skateboard 10 comprises a circular footboard 11 which includes a handle 21 secured to the footboard 11 which is provided with a foot holder 12 for each foot in the form of toe straps 26 and heel wells 27. Preferably the skateboard footboard 11 is made of glass fiber reinforced plastic material with the other associated functioning parts made of various plastic or metal material following the techniques used in the art, or other suitable techniques, the variety of materials that may be used therein are well known in the art and require no separate description herein.

The skateboard 10 is propelled by the shifting of weight in which the user stands on the footboard 11 with his shoes placed in elastic toe straps 26 and resilient heel wells 27 and holding on to handle 21, shifts his weight downward and forward, back and forth, from foot to foot oscillating his weight in the forward direction. The user's weight force applied on the footboard 11 alternately from side to side in the forward direction oscillates rack 18 which is secured on flange 20. Flange 20 is molded with the rack 18 and is suitably secured to the bottom side of the footboard 11 by plastic welding, cementation, or it may be for molded in one component part. Footboard 11 is rotatably secured to axle support boss 19 in which bearing means 32 permits the footboard 11 to oscillate or rotate in either direction. Bearing 32 is rotatably mounted on the support boss 19 and spindle 30 which are one unit and suitably secured by the keeper 29 to ring support plate 34 which is riveted or bolted to the footboard 11 by rivets or bolts 28. Spindle 30 is grove cut to secure the keeper 29 in place. Other securing means may supplant that shown.

The shape, length and dimensions of the skateboard or weight carrier is, of course, subject to variation. For adults it is preferred that the skateboard be two or three feet in diameter or width, for the purposes of stability, increased forward oscillation, and more maneuverability, in which a part of the foot load is transmitted from side to side on the foot board 11 to the clutched pinions 16 secured on axle 17. The forward weight force applied to the clutched pinions 16 forces axle 17 to rotate in the forward direction during oscillation. The one-way clutches may be modified and used in the wheels, 15, in conjunction with the clutched pinions 16. This arrangement is cited only to show the modification and may or may not be used at all. Wherein the one-way clutch bearings 24 in the wheels 15 engage the inside wheel casing 33 driving each wheel 15 forward as the foot load is shifted from side to side in the foot holders 12 relative to the amount of weight force applied thereon. The ratchets 25 fixedly secured to the axle 17 cause the bearings 24 to engage the wheels 15 in the forward direction and disengage in the other direction in which the wheels 15 then roll freely. Clutched wheels 15 and clutched pinions 16 then being clutched to the axle 17, engage the axle 17 in one direction and roll freely in the other direction.

But preferably the axle 17 is cut at point 35 to form two axles 36 and 37 to run independently of each other and the one-way ratchet clutches, which engage the axles are secured in the pinions 16. Stabilizing boss/sleeve or bearing 38 secured in place by keeper 40 allows axle 36 to rotate effectively without sliding out of support boss 19. Stabilizing boss sleeve or bearing 39, which is secured in place by keeper 41 also allows axle 37 to suitably rotate without sliding out of the said boss 19. Inside axle 42 secured on one side by pin 43, further stabilizes the two axles 36 and 37 and permits both axles to run independently of each other.

Castors 23 are suitably positioned and secured to the under side of the skateboard 11 to prevent the footboard from tipping too far to the skating surface, in which the castors 23 prevent the footboard 11 from rubbing the skating surface. Castors 23 pivot and rotate while also stabilizing the skateboard, enabling the user to simultaneously oscillate forward and/or spin the skateboard in the desired direction, responssive and relative to the shifting of weight to effect the thrust and also in proportion to the amount of weight torque transmitted to the pinions 16 and/or wheels 15. The center and back wheels of the skateboard may be elevated so the footboard 11 is positioned in a slanted arrangement to effect easier oscillation, and suitably converting body weight into mechanical forward motion.

Suitable known responsive braking means should, of course, be secured on the skateboard to permit controlled skating and stopping. This said braking means is not shown.

May it be also realized that the instant invention can also function without the rotation of the axle 17, wherein with the oneway clutches in the wheels 15, the oscillating footboard 11 which oscillates alternately back and forth, as the users weight is applied on the footboard, the rack 18 secured to the footboard oscillates the non rotating pinions 16 on the non rotating axle 17, so that as the rack 18 oscillates one pinion 16 moves forward (not rotating) and the other pinion 16 moves backward (not rotating) until the user applies his weight force forward above the other pinion again. This means that the pinions 16 and the axle 17, oscillate but do not rotate. The imparted oscillations of the pinions 16 and the said axle 17, cause the clutched wheels 15 to alternately and angularly roll forward as the user shifts his weight force in sequence, resulting in suitable forward motion of the skateboard 10 relative to the angular oscillations of the user and the footboard 11. In this regard modifications can be made to secure the axle means 17, 36 and 37 with suitable bracket means to the footboard which will effectively enable the skateboard to function without the rack, pinions, and the central support boss with the spindle, using only the clutched wheels secured on axles.

While this invention is described and illustrated herein, it is not proposed that this invention be limited to the exact details of construction herein shown in the drawing and described in the specification and that reservations of rights are made, to the end that any necessary changes and modifications may be made therein, which may come within the scope of this invention.

What I claim:

1. In a skateboard for supporting a user and adapted to be propelled by oscillatory motion of the user's body, comprising a suitable footboard, having a curved rack mounted on said footboard, said rack having a plurality of teeth on its surface, a support boss extending below said footboard along a central vertical axis thereof, said support boss having an integral spindle at its upper end, bearing means for rotatably supporting said footboard with respect to said support boss, said support boss having an aperture means through its lower portion for receiving the inner ends of two independently rotatable diametrically opposite axles, a clutched pinion secured to each said axle for engagement with said rack, a wheel means secured to the outer end of each said axle, and castors suitably secured to said footboard.

2. In a weight carrier propelled by the shifting of weight, including a suitable platform member for supporting said weight, a curved rack mounted about the said platform, said rack having a plurality of teeth on one surface, a support boss extending below said platform along a central vertical axis thereof, said support boss having an integral spindle at its upper end, bearing means for rotatably supporting said platform with respect to said support boss, said support boss having a suitable aperture means through its lower portion for receiving the oscillating and rotatable axle, clutched pinions secured to the axle for engagement with said rack, suitable wheels secured to the outer ends of said axle in a driving relationship with the pinions and the axle, wherein as the platform is rotated, the forwardly rotated clutched pinion is in driving engagement with the axle while the rearwardly rotated clutched pinion is disengaged from the axle; and a castor means suitably secured to the underside of the said platform.

* * * * *